United States Patent
Burnett et al.

(10) Patent No.: US 11,287,541 B2
(45) Date of Patent: Mar. 29, 2022

(54) METHOD TO DESIGN GEOPHYSICAL SURVEYS USING FULL WAVEFIELD INVERSION POINT-SPREAD FUNCTION ANALYSIS

(71) Applicants: William A Burnett, Houston, TX (US); Martin J. Terrell, Spring, TX (US); Pavel Dimitrov, Spring, TX (US); Thomas A. Dickens, Houston, TX (US); Yaxun Tang, Spring, TX (US); Partha S. Routh, Katy, TX (US); William Curry, Houston, TX (US); Dennis E. Willen, Conroe, TX (US)

(72) Inventors: William A Burnett, Houston, TX (US); Martin J. Terrell, Spring, TX (US); Pavel Dimitrov, Spring, TX (US); Thomas A. Dickens, Houston, TX (US); Yaxun Tang, Spring, TX (US); Partha S. Routh, Katy, TX (US); William Curry, Houston, TX (US); Dennis E. Willen, Conroe, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 342 days.

(21) Appl. No.: 15/371,759

(22) Filed: Dec. 7, 2016

(65) Prior Publication Data
US 2017/0176613 A1    Jun. 22, 2017

Related U.S. Application Data

(60) Provisional application No. 62/269,212, filed on Dec. 18, 2015.

(51) Int. Cl.
*G01V 1/28* (2006.01)
*G01V 11/00* (2006.01)
*G01V 1/00* (2006.01)

(52) U.S. Cl.
CPC .............. *G01V 1/282* (2013.01); *G01V 1/003* (2013.01); *G01V 11/00* (2013.01)

(58) Field of Classification Search
CPC ........ G01V 1/282; G01V 1/003; G01V 11/00; G01V 1/28; G01V 1/30; G01V 2210/66; G06F 17/5009; G06F 2217/16
(Continued)

(56) References Cited

U.S. PATENT DOCUMENTS 7,752,022 B2 * 7/2010 Fornel ..................... E21B 43/00
                                                                  703/10
9,176,930 B2    11/2015 Lee et al.
(Continued)

OTHER PUBLICATIONS

G. A. Oldenborger and at el, "The point-spread function measure of resolution for the 3-D electrical resistivity experiment", Geophys. J. Int. (2009) 176, 405-414 (Year: 2009).*

(Continued)

*Primary Examiner* — Douglas Kay
(74) *Attorney, Agent, or Firm* — ExxonMobil Upstream Research Company—Law Department

(57) ABSTRACT

A method, including: determining, with a computer, point spread functions for a plurality of parameter locations by performing at least a portion of a first iteration of an iterative full wavefield inversion process; determining at least one property for each of the point spread functions; and evaluating a candidate survey design based on the at least one property for each of the point spread functions.

12 Claims, 9 Drawing Sheets

(58) Field of Classification Search
USPC .......................................................... 702/14
See application file for complete search history.

(56) References Cited

U.S. PATENT DOCUMENTS

| | | | |
|---|---|---|---|
| 2004/0186667 | A1 | 9/2004 | Lee |
| 2004/0220744 | A1* | 11/2004 | Voutay ..................... G01V 1/32 702/14 |
| 2007/0005253 | A1* | 1/2007 | Fornel ..................... E21B 43/00 702/14 |
| 2008/0237485 | A1* | 10/2008 | Beinhocker ............. G01T 1/167 250/474.1 |
| 2010/0135511 | A1* | 6/2010 | Pontoppidan ........ H04R 25/505 381/313 |
| 2010/0142316 | A1* | 6/2010 | Keers ..................... G01V 1/282 367/15 |
| 2011/0090760 | A1* | 4/2011 | Rickett .................. G01V 1/282 367/73 |
| 2014/0278110 | A1* | 9/2014 | Chugunov ............. G01V 11/00 702/6 |
| 2014/0278116 | A1* | 9/2014 | Halliday ................ G01V 1/005 702/14 |
| 2014/0350897 | A1* | 11/2014 | Hobro ..................... G01V 1/302 703/1 |
| 2014/0379266 | A1 | 12/2014 | Jiao et al. |
| 2015/0070681 | A1* | 3/2015 | Uno .......................... G03F 1/70 355/77 |
| 2015/0073755 | A1* | 3/2015 | Tang ........................ G01V 1/28 703/2 |
| 2015/0268365 | A1* | 9/2015 | Djikpesse ................ G01V 1/42 702/14 |
| 2016/0090825 | A1* | 3/2016 | Imhof ..................... E21B 43/00 703/10 |
| 2016/0097870 | A1* | 4/2016 | Routh ..................... G01V 1/282 703/2 |
| 2016/0131785 | A1* | 5/2016 | Tonchia ............... G01V 1/3808 367/15 |
| 2016/0274257 | A1* | 9/2016 | Corcoran ............... G01V 1/345 |
| 2017/0168177 | A1* | 6/2017 | Wang ....................... G01V 1/36 |
| 2017/0169545 | A1* | 6/2017 | Turkan .................. G06T 3/4076 |
| 2017/0192118 | A1* | 7/2017 | Du ......................... G01V 1/282 |
| 2018/0045839 | A1* | 2/2018 | Tang ...................... G01V 1/364 |
| 2018/0120464 | A1* | 5/2018 | Sun ........................ G01V 1/282 |

OTHER PUBLICATIONS

Y. Tang, "Imaging and Velocity Analysis By Target-Oriented Wavefield Inversion", Ph. D. Thesis, Graduate Studies of Stanford University (Year: 2011).*

X. Huang and et el, "Born modeling for heterogeneous media using the Gaussian beam summation based Green's function", Journal of Applied Geophysics 131 (2016) 191-201 (Year: 2016).*

N. Kamathand I. Tsvankin, "Sensitivity analysis for elastic full-waveform inversion in VTI media", SEG Technical Program Expanded Abstracts 2014 (Year: 2014).*

Ayeni (G. Ayeni and et al, "Wave-equation inversion of time-lapse seismic data sets", SEG San Antonio 2011 Annual Meeting pp. 4149-4154) (Year: 2011).*

Chen, B. and X. Bi Xie, 2015, An efficient method for broadband seismic illumination and resolution analyses, Expanded Abstracts of 85th Annual Meeting of Society of Exploration Geophysicists, 4227-4231.

Dickens, T. A., and G. A. Winbow, 1997, Spatial resolution of diffraction tomography, Journal of Acoustical Society of America, 101, 77-86.

Fichtner and Trampert, 2011, Hessian kernels of seismic data functionals based upon adjoint techniques, Journal International, 185, 775-798.

Jin, S. and S. Xu, 2010, Visibility analysis for target-oriented reverse time migration and optimizing acquisition parameters, The Leading Edge, 29, 1372-1377.

Lecomte, I., 2008, Resolution and illumination analysis in PSDM: A ray-based approach, The Leading Edge, 27, 650-663.

Miller, C. R., and P. Routh, 2007, Resolution analysis of geophysical images: Comparison between point spread function and region of data influence measures, Geophysical Prospecting, 55, 835-852.

Tang, Y., 2011, Imaging and Velocity Analysis by Target-Oriented Wavefield Inversion: Ph.D. Dissertation, Stanford University.

Xie, X. B., S. Jin, and R. S. Wu, 2006, Wave-equation-based seismic illumination analysis, Geophysics, 71, S169-S177.

Fichtner, A. et al. (2011) "Resolution analysis In full waveform inversion", Geophysical Journal international, vol. 187, No. 3, pp. 1604-1624.

Routh, P.S., et al (2005) "Optimal Survey design using the point spread function measure of resolution", SEG Technical Program Expanded Abstracts 2005, Nov. 1, 2005 (Nov. 1, 2005), pp. 1033-1036.

* cited by examiner

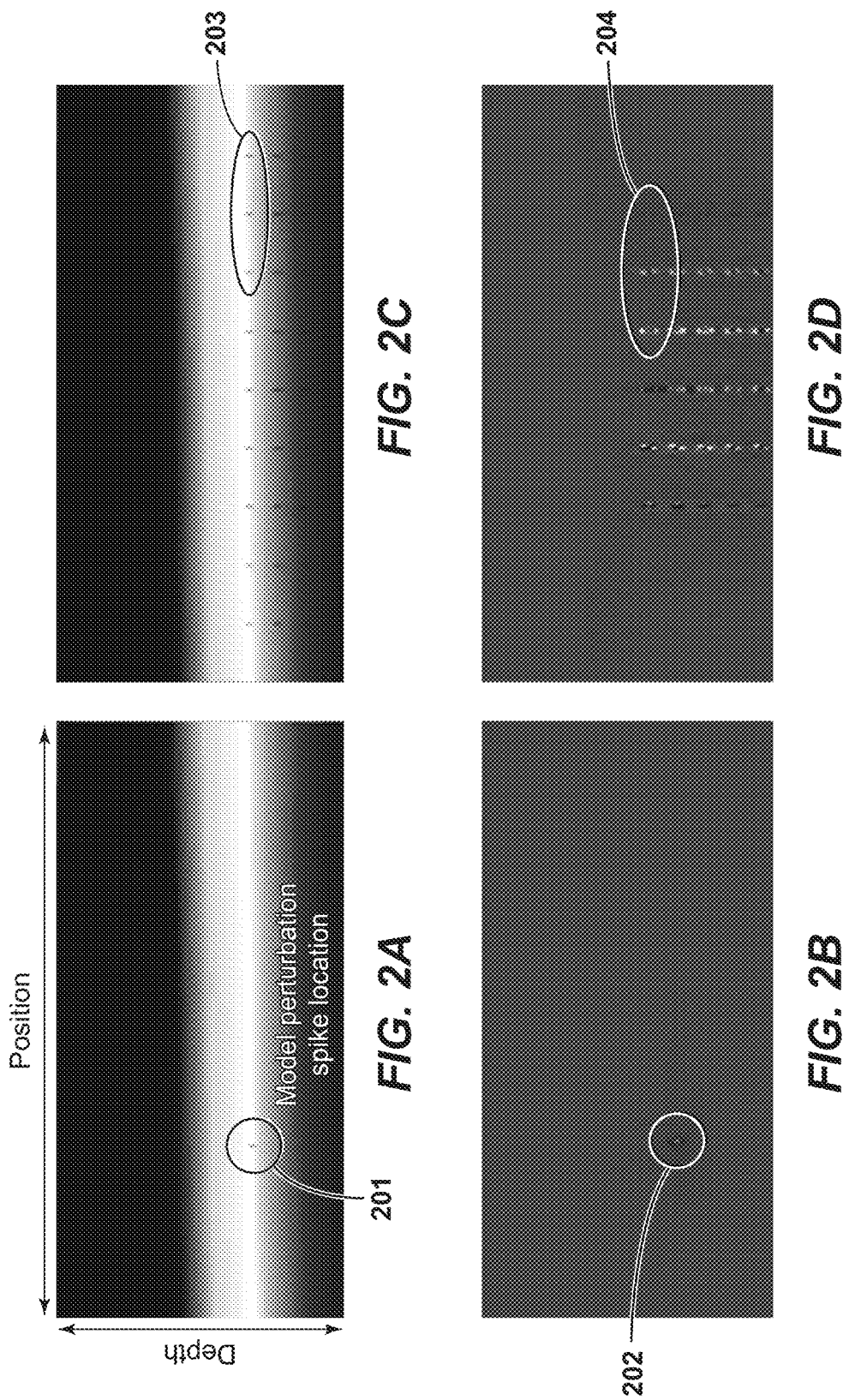

FIG. 7A Complete Coverage

FIG. 7B Surface Reflections, Infinite Aperture

FIG. 7C Surface Reflections, Limited Aperture

FIG. 7D Surface Reflections, Add Low Frequencies

FIG. 7E Surface Transmitted Waves

FIG. 7F Surface Recording with Reflections and Transmissions

METHOD TO DESIGN GEOPHYSICAL SURVEYS USING FULL WAVEFIELD INVERSION POINT-SPREAD FUNCTION ANALYSIS

CROSS-REFERENCE TO RELATED APPLICATION

This application claims the benefit of U.S. Provisional Patent Application 62/269,212 filed Dec. 18, 2015 entitled A METHOD TO DESIGN GEOPHYSICAL SURVEYS USING FULL WAVEFIELD INVERSION POINT-SPREAD FUNCTION ANALYSIS, the entirety of which is incorporated by reference herein.

FIELD OF THE INVENTION

Exemplary embodiments described herein pertain to the field of geophysical prospecting and, more particularly, to seismic survey prospecting for hydrocarbons. Specifically, the exemplary embodiments relate to methods for using full wavefield inversion.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Three-dimensional (3D) seismic surveys in the exploration industry can cost tens to hundreds of million dollars. 3D survey data are expensive to acquire because of the necessary short receiver and source intervals, which are primarily driven by signal and noise issues and the wide range of offsets and azimuths that are required by imaging methods. Ultimately the quality of the processed data and subsequent interpretations are dependent on how well the survey was designed and acquired. No matter how sophisticated the methods used to process the data are, the processing cannot compensate for a poorly planned 3D survey and inadequate sampling, which can end up making the survey a waste of time and resources if it does not meet its objectives.

Acquisition design typically starts by assuming different designs and then testing and evaluating each design. The first step is a survey geometry analysis based strictly on surface bins. For each survey geometry, bin-based attributes, such as the fold and the offset and azimuth distributions, are computed assuming uniform earth properties. The attributes are used to select a few survey geometries for further consideration. Then if the geometry is complex, a geological model may be constructed and used for further evaluation of a few designs selected based on the geometry analysis. Source and receiver locations are assumed and seismic waves are then propagated from each of the sources to the target and then to each of the receivers using some form of computer simulation. The computer simulation may be done with ray-tracing methods or by solving the one-way or two-way wave-equation. Wave-equation methods are more accurate for complex media but are much more computer intensive. Methods differ in how they use and evaluate the computer simulations for each survey design.

Full-wavefield inversion (FWI) is an iterative approach to estimating subsurface parameters using geophysical data and wave physics. Routh et al. (2014) discloses a method for designing seismic surveys using FWI, in which synthetic data are generated and inverted using a suite of candidate acquisition plans over a parameterized geologic model of the subsurface. In their approach, the ability of FWI to recover subsurface parameters is quantified and compared among candidate surveys. Various well-known measures can be used to quantify how accurately the subsurface model has been recovered. One of these measures is the point-spread function (PSF), which describes the ability of the inversion process to estimate a parameter model perturbation as a function of location in the subsurface. When data acquisition and FWI are ideal, the PSF would mimic the model perturbation itself; for example, a spike in a single parameter and at a single location in the model would yield a PSF that is a spike in the same parameter with the same magnitude and location. Since factors like spatial sampling and bandwidth are rarely all ideal in practice, resolution and sensitivity are imperfect, and the inversion process cannot recover the exact values of subsurface parameters. For such non-ideal surveys, a spike in a single parameter and at a single location in the model will then yield a PSF that is poorly focused (i.e., "spread") over neighboring spatial locations and across other parameters.

Point-spread functions are commonly applied to improve FWI algorithm efficiency, and Miller and Routh (2007) use PSF analysis to appraise the quality and resolution of the recovered parameters. Estimating exact point-spread functions is a computationally expensive process.

Dickens and Winbow (1997) applied a similar concept to the point-spread function (the object function) to analyze tomographic resolution and angular wavenumber coverage provided by various survey geometries. Tomography is another iterative approach to estimating subsurface parameters which emphasizes wavefront travel time, unlike FWI which accounts for wavefield travel time and amplitude information.

At the SEG Conference in October 2015 (Chen et al. 2015), researchers at Univ. of California, Santa Cruz described automating and spatially mapping results of PSF analysis. They do not use FWI point spread functions though, and they still use imaging-based PSFs.

SUMMARY

A method, including: determining, with a computer, point spread functions for a plurality of parameter locations by performing at least a portion of a first iteration of an iterative full wavefield inversion process; determining at least one property for each of the point spread functions; and evaluating a candidate survey design based on the at least one property for each of the point spread functions.

The method can further include analyzing, with a computer, the point spread functions by transforming the point spread functions to another domain and comparing them to predetermined point spread amplitude patterns in the other domain.

In the method, the analyzing can include analyzing a wavenumber spectrum of the point spread functions, identifying missing wavenumber components, and adjusting parameters of the candidate survey design to better recover the missing wavenumber components.

In the method, the analyzing can include back-propagating a simulated wave from a target in a subsurface parameter model to identify source or receiver locations that can be used to recover the missing wavenumber components.

The method can further include generating a coverage map for the least one property for each of the point spread functions.

The method can further include simultaneously approximating the point spread functions for corresponding parameter locations in a subsurface parameter model by perturbing the subsurface parameter model with a plurality of spikes.

In the method, the extracting can include using a subsurface parameter model, acquisition parameters, and perturbations to the subsurface parameter model as inputs the iterative full wavefield inversion process and performing enough of the full wavefield inversion process to calculate a Hessian operator applied to the perturbations to the subsurface parameter model.

In the method, the extracting can include creating synthetic data by forward modeling a subsurface parameter model, using the synthetic data and a perturbed version of the subsurface parameter model in the at least a portion of a first iteration of the iterative full wavefield inversion process to generate an updated subsurface parameter model, and determining the point spread functions based on a difference between the updated subsurface parameter model and the perturbed version of the subsurface parameter model.

In the method, the extracting can include performing multiple full wavefield inversion processes to derive different updated models relative to the subsurface parameter model, and determining the point spread functions based on a difference between the different updated subsurface parameter models.

The method can further include adjusting at least one of frequency content of sources, source activation timing, receiver bandwidth, spatial coordinates of a source, or spatial coordinates of a receiver based on the at least one property for each of the point spread functions.

In the method, a first full wavefield inversion process can use synthetic data forward modeled from a subsurface parameter model and a second full wavefield inversion process uses synthetic data modeled from a perturbation of the subsurface parameter model.

The method can further include determining acquisition parameter updates for the candidate survey based on the at least one property for each of the point spread functions, and selecting which acquisition parameter updates to implement by using a survey design objective function that relates the at least one property for each of the point spread functions to acquisition parameters.

In the method, the evaluating can include using the at least one property for each of the point spread functions as a survey design metric to quantify performance of the candidate survey.

The method of claim 1, further comprising carrying out a geophysical survey based on the candidate survey design.

A method, including: obtaining a subsurface parameter model; injecting at least one source function into the subsurface parameter model at a target location; and determining an adjustment to an acquisition parameter by back propagating a wave from the target location using the at least one source function or by using a survey design objective function that relates at least one point spread function property to an acquisition parameter.

In the method, the adjustment to the acquisition parameter is a number of sources or receivers or locations of sources or receivers.

In the method, the objective function is used.

In the method, the back-propagation is used.

A method, including: obtaining a survey design objective function, which expresses at least one point spread function property as a function of at least one acquisition parameter; obtaining an initial survey design; and iteratively performing the following steps, with an initial survey design, until a predetermined stopping criteria is reached, performing, with a computer, at least a portion of a first iteration of an iterative full wavefield inversion process, which is at least sufficient to yield point spread functions distributed throughout a subsurface parameter model, determining properties of the point spread functions, and updating the initial survey design by grid search or stepping toward optimal survey parameters based on the survey design objective function and the properties of the point spread functions.

A method, including: obtaining a survey design objective function, which expresses at least one point spread function property as a function of at least one acquisition parameter; within the target region, designing source functions which cover targeted point spread function wavenumber content; injecting the designed source functions into a parameter model to identify and select an initial survey design which obtains the targeted point spread function wavenumber content; performing, with a computer, at least a portion of a first iteration of an iterative full wavefield inversion process, which is at least sufficient to yield point spread functions distributed throughout the subsurface parameter model for the initial survey design; determining properties of the point spread functions; and updating the initial survey design by grid search or stepping toward optimal survey parameters based on the survey design objective function and the properties of the point spread functions.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

FIG. 2A is an exemplary two-dimensional (spatial) parameter model perturbed with a single spike.

FIG. 2B is the exact PSF extracted at the location of the spike in FIG. 2A.

FIG. 2C is the same parameter model in FIG. 2A, but with several spike perturbations.

FIG. 2D is an example of FWI used with the perturbed model in FIG. 2C to extract several approximate point spread functions simultaneously.

DETAILED DESCRIPTION

Figure 1:
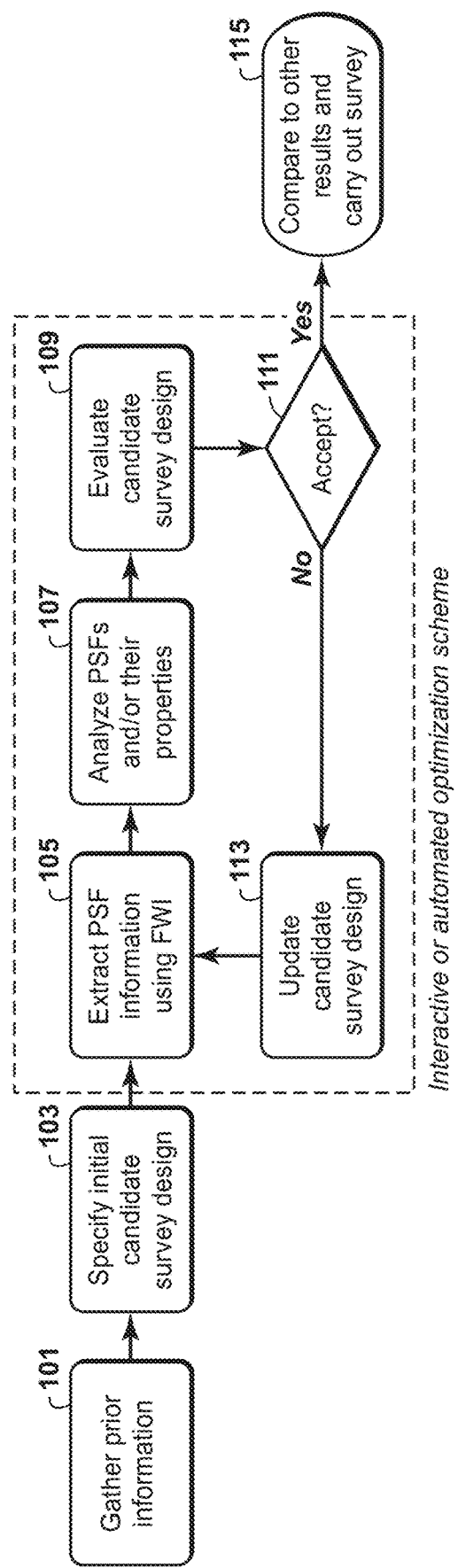
FIG. 1 is an exemplary method of applying full wavefield inversion point-spread function analysis to geophysical survey design.

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement extends the concept of FWI PSF analysis to survey design by using an efficient approximation of point-spread functions. PSF resolution analysis has been previously applied to survey design, but these applications have used linear (non-iterative) imaging tools such as ray-tracing (Lecomte, 2008) or finite-difference forward modeling (Xie et al., 2006). In contrast, the present technological advancement approximates point-spread function information using FWI; wherein the information used to approximate the PSF is extracted during one or more iterations of this nonlinear process. While previous survey design methods are focused on improving linear imaging methods such as migration, they cannot appraise how a survey design will impact the performance of FWI. The present technological advancement provides the ability to assess how an arbitrary survey layout will impact FWI performance throughout an arbitrary prior geologic parameter model. FWI performance is characterized by a variety of survey-dependent criteria, including illumination, resolution, angular coverage, wavenumber content, and parameter recovery. Analyzing point spread functions (PSFs) provides some measure of all of these criteria when extracted using an FWI process.

The present technological advancement can compute several approximate point-spread functions simultaneously following Tang (2011; p. 43-50) and then automate their analysis such that their properties can be spatially mapped and used as survey design criteria. However, while PSF analysis provides technical information needed for survey planning, acquiring geophysical data is also subject to many practical limitations such as source and receiver locations, cost, resource availability, terrain, infrastructure, and timing. Optimal survey layouts therefore cannot be based only on physical or mathematical constraints, but must also incorporate practical limitations. The present technological advancement can include geophysical survey design and optimization subject to operational considerations faced in practical field acquisition environments. It will be apparent to someone skilled in the art of seismic survey design that a survey need not be optimal in an absolute technical sense but should produce data to recover the parameter described by the PSF with sufficient accuracy, in an acceptable time frame, and at an acceptable cost, while limiting the hazards and environmental impacts associated with operating seismic survey equipment.

Point-spread functions are sensitive to many of the decisions made during survey design, and it is possible to analyze how they change among various candidate surveys, geologic model scenarios, and levels of physical accuracy. The present technological advancement can be used with many geophysical survey types, such as seismic or electromagnetic surveys, and is applicable for any equipment configuration including, but not limited to land, marine, airborne, borehole, streamer, node, autonomous vehicle, narrow-azimuth, wide-azimuth, simultaneous source, 2D, 3D, time-lapse, targeted, etc.

The present technological advancement can approximate point-spread functions (PSFs) using full-wavefield inversion (FWI) and then analyze the results to evaluate, update, or optimize geophysical survey designs. FIG. 1 illustrates an exemplary method used to evaluate survey designs using FWI-generated Point Spread Functions. This method may be repeated for any number of survey geometries, model scenarios, or other possible variations, and the resulting PSFs can be compared. In step 101, prior information about a subsurface region is gathered, which can include previous geophysical, engineering, or geological data. Additionally, the information gathered in step 101 can include an initial subsurface parameter model. The term subsurface parameter model or physical property model as used herein refers to an array of numbers, typically a 3-D array, where each number, which may be called a model parameter, is a value of velocity, density or another physical property in a cell, where a subsurface region has been conceptually divided into discrete cells for computational purposes. Other information that can be gathered in step 101 includes the expected frequency content of the acquisition equipment and locations of key targets or features.

In step 103, an initial survey design is specified—this is preferably based on legacy surveys in the area, surveys from similar environments, or traditional survey design methods, but can be randomly selected. Those of ordinary skill in the art will know how to specify an initial survey design. The term survey design, or any equivalent terms such as acquisition geometry, refers to specific patterns for source and receiver locations (source and receiver grids) and to the number of receivers (the receiver patch) active for each source excitation. Such acquisition geometries, as selected in step 103, can be characterized by standard bin-based attributes, such as the aperture (extent of the area covered by sources and receivers), source sampling, receiver sampling, fold, offset distribution, and azimuth distribution, etc.

Steps 105 through 113 in FIG. 1 represent a process loop which may be performed manually or may be automated by an appropriately programmed computer in an optimization scheme. Step 105 can be performed in a variety of approaches outlined in FIGS. 4-6. All approaches share a similar strategy in simultaneously approximating point-spread functions for a corresponding number of parameter locations by perturbing the parameter model with a grid of spikes. The spike grid perturbation has been demonstrated as a PSF approximation for FWI preconditioning purposes by Tang (2011; p. 61-66); here it is recognized by the present inventors that this approach yields a spatial distribution of FWI performance affected by the survey geometry. The grid of spike perturbations need not be regular or orthogonal—it may have variable spacing or it may conform to a geologically significant surface or region within the model. These perturbations may be added to any or all of the parameters in a multi-parameter physical model. For example, in the case of elastic seismology, PSFs can be generated for a variety of parameters, such as P-wave velocity, S-wave velocity, anisotropy, density, impedance, etc.

Each spike within the grid perturbation produces an approximate point-spread function at the spike location. The approximation assumes that individual spike perturbations in the grid are placed far enough apart to simultaneously generate PSFs with little or no degradation or overlap. FIGS. 2A-2D show an example of a single exact point-spread function (FIGS. 2A-2B) compared to the approach of approximating multiple point-spread functions simultaneously (FIGS. 2C-2D).

FIG. 2A shows a two-dimensional (spatial) parameter model perturbed with a single spike 201. FIG. 2B shows a full exact PSF 202 extracted at the location of the spike 201 in FIG. 2A. The full exact PSF 202 is the same size as the parameter model, but the detailed information is near the spike location. FIG. 2C includes the same parameter model as in FIG. 2A, but with several spike perturbations 203. FIG. 2D shows a result when FWI is used with the perturbed model in FIG. 2C to extract several approximate point-spread functions 204 simultaneously. Compared to an exact PSF 202 as shown in FIG. 2B, these point-spread functions 204 overlap with each other, but the overlap is negligible if the point-spread functions 204 are spatially compact.

The full exact PSF for each location contains the same number of discrete elements as the parameter model, but in many cases, the elements near the point perturbation contain most of the information useful for survey design. Spatial windowing, as it will be referred to here, is a process of selecting only the discrete elements of the perturbation grid or extracted PSF grid which corresponds to locations nearby a single known perturbation location. When PSF amplitudes from neighboring perturbations do not overlap significantly, each PSF is referred to as spatially compact compared to the perturbation grid—more specifically, most of the information for each PSF must be contained within roughly half of the perturbation spacing. This assumption of spatial compactness underlies a preferred efficient embodiment of the present technological advancement, as point-spread functions can always be estimated individually, but the ability to simultaneously extract some number N of point-spread functions reduces the computational effort by N-times. Note that the present technological method can generalize to the case of single-spike perturbations in the parameter model which extract exact point-spread functions, albeit inefficiently.

Figure 3B:
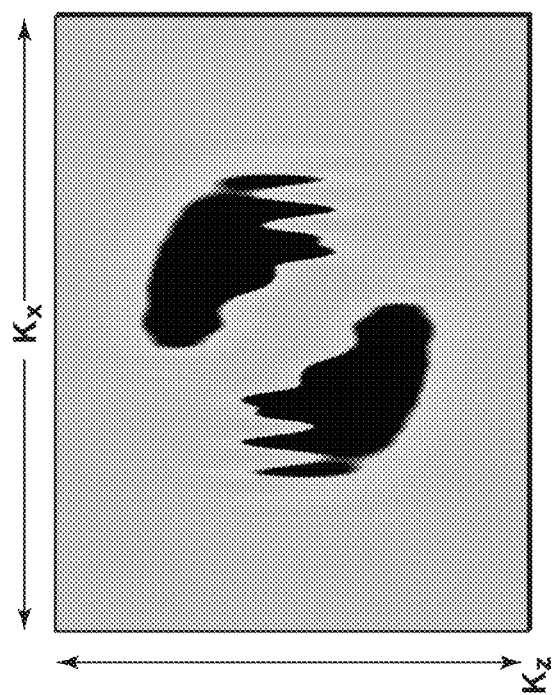
FIG. 3B is an exemplary single point spread function isolated from FIG. 2D in the wavenumber domain.
Figure 3A:
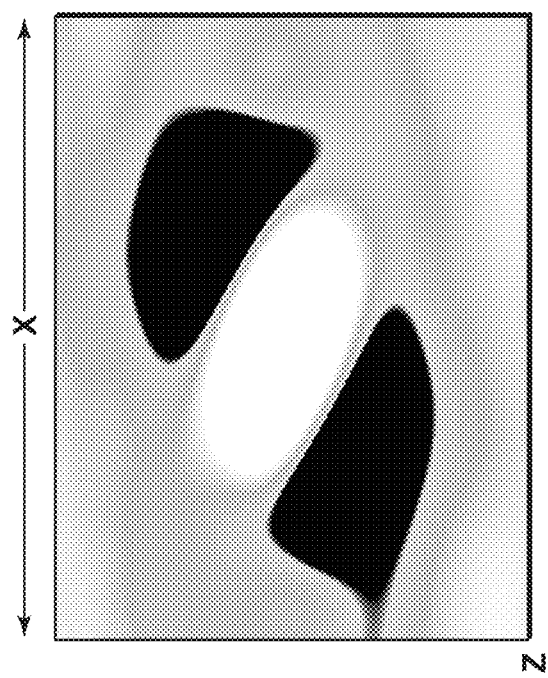
FIG. 3A is an exemplary single point spread function isolated from FIG. 2D in the spatial domain.
Figure 7:
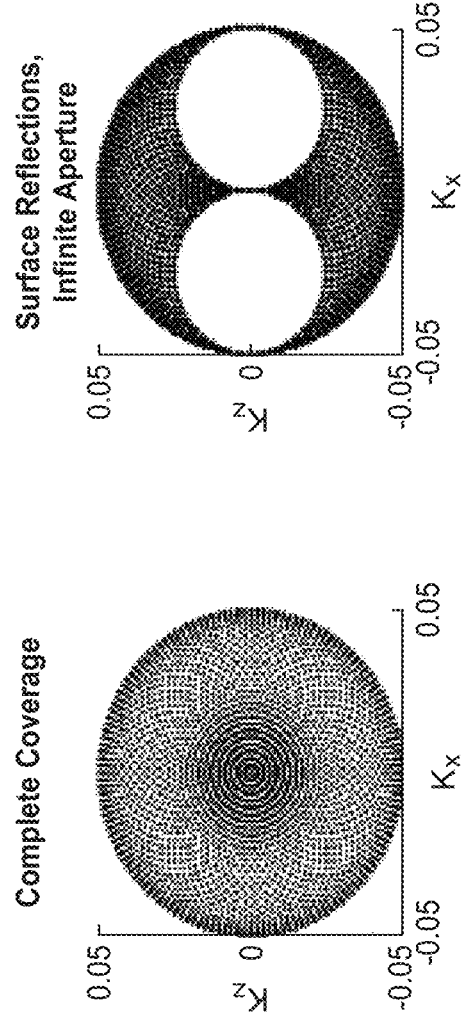
FIGS. 7A, 7B, 7C, 7D, 7E, and 7F are exemplary plots of constant-velocity Born-scattering approximations for a point spread function in the wavenumber domain.

In step 107 of FIG. 1, point-spread functions are analyzed by visual inspection, or automatically using a computer. If each PSF is spatially compact relative to the perturbation spacing, spatial windowing can be applied around each PSF to isolate its strongest amplitudes. A variety of analyses for each windowed PSF can then be performed to determine whether or not the current survey configuration provides adequate information at that location. FIGS. 3A and 3B illustrate a preferred analysis approach, which is to apply a spatial Fourier transform to each window and examine it in the wavenumber domain. An example of a spatially-windowed PSF is shown in FIG. 3A, and its wavenumber domain representation is shown in FIG. 3B. The PSF examples in FIGS. 3A-3B are single-parameter and two-dimensional, but the windowing and analysis approach presented here generalizes to multi-parameter 3D FWI cases. Automated analysis of FWI PSFs is also unique for survey design. This analysis may include transforming the windowed point-spread functions to other domains such as the Radon or Fourier domains. Properties of each PSF including, but not limited to, its dip-dependent bandwidth, overall amplitude, dip-sectored amplitude, central amplitude, evolution among FWI iterations, standard deviation, or focusing can be extracted in the various domains. Methods of extracting these properties include single-value extraction, thresholding, masking, or a generalized Radon transform of each PSF. FIG. 7 shows examples of how PSF amplitude patterns in the wavenumber domain can be used to estimate survey design parameters. Further explanation of how PSF amplitudes and properties relate to survey design parameters is provided after the description of FIG. 7 below.

Figure 8:
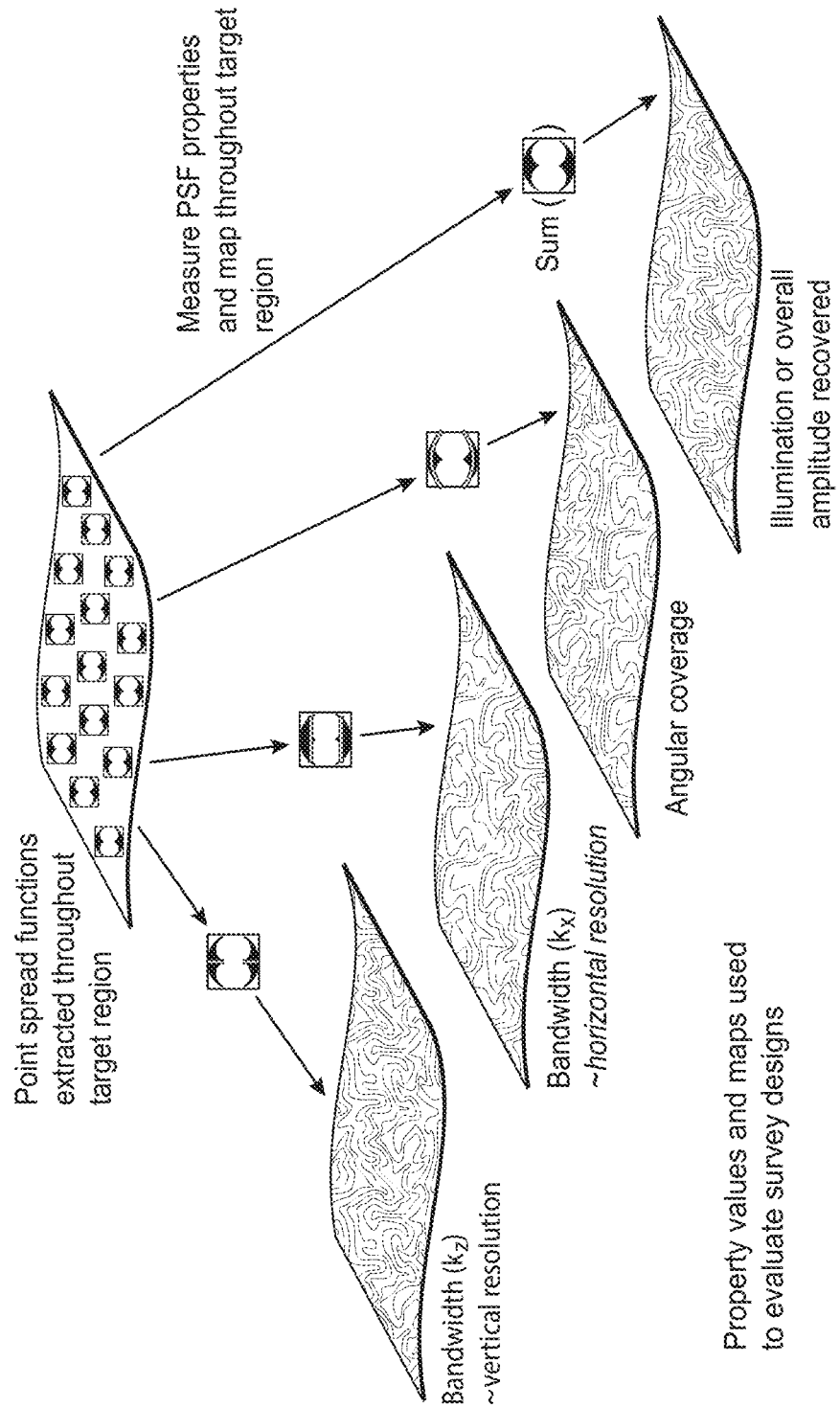
FIG. 8 illustrates a concept of mapping exemplary FWI point spread function properties for use in survey design.

Once PSF properties are extracted, they can be individually inspected at a target location or mapped throughout regions of the subsurface model (see FIG. 8, described below). Steps 109 and 111 in FIG. 1 involve making the decision to accept or reject a survey design based on the PSF analysis results. The evaluation can be done by manually interpreting the results or by computing an objective function value for the candidate survey based on its PSF properties. For example, the objective function can compare the PSFs from a candidate survey design with target PSFs, and then survey parameters can be adjusted to minimize the objective function. The objective function can relate PSF properties to acquisition parameters. In either case, an acceptable survey at this point must also meet operational limitations of geophysical acquisition, such as safety, environment, cost, timing, equipment availability, terrain, infrastructure, simultaneous operations, and so on. This is a key distinction from theoretical applications of point-spread functions in the technical field of sensor optimization. A survey design may be accepted at this point as feasible, before subsequent comparison with workflow results from other predetermined survey design candidates. Then in step 115, the survey can be carried out and data acquired.

Step 113 in FIG. 1 is an optional step for updating the survey design before repeating the analysis. As with other steps, this update process can be done manually or automatically. One way to automate the update is to use the difference between each measured PSF and a desired PSF to find key survey locations needed to provide missing PSF information content. For example, if the PSF analysis shows missing wavenumber content or illumination at a certain orientation, a simulated seismic wave with that orientation can be back-propagated to the survey region using ray tracing or wavefield simulation in order to identify influential locations. Examples of this approach are described below (see, for example, discussion regarding the use of a survey design objective function that relates point spread function properties to acquisition parameters and operational constraints).

Figure 4:
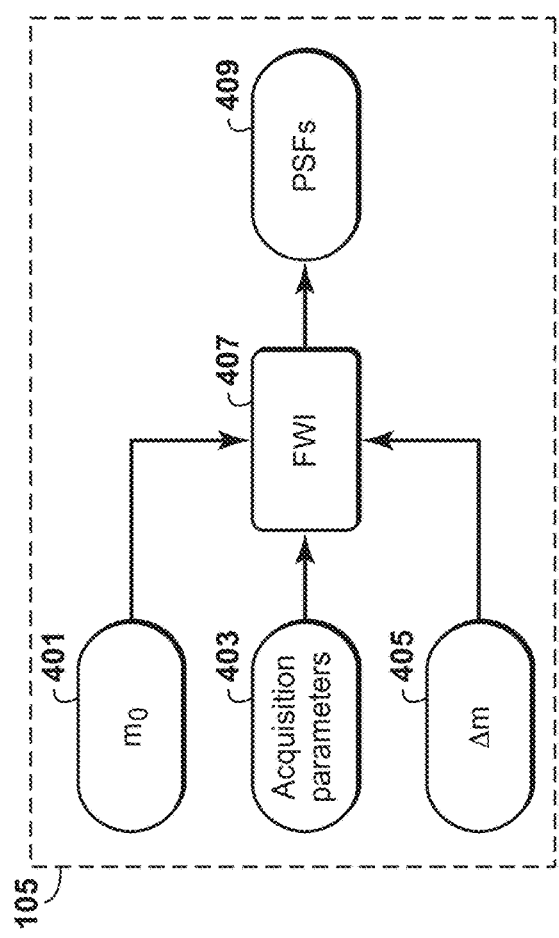
FIG. 4 is an exemplary method for extracting point spread functions.
Figure 5:
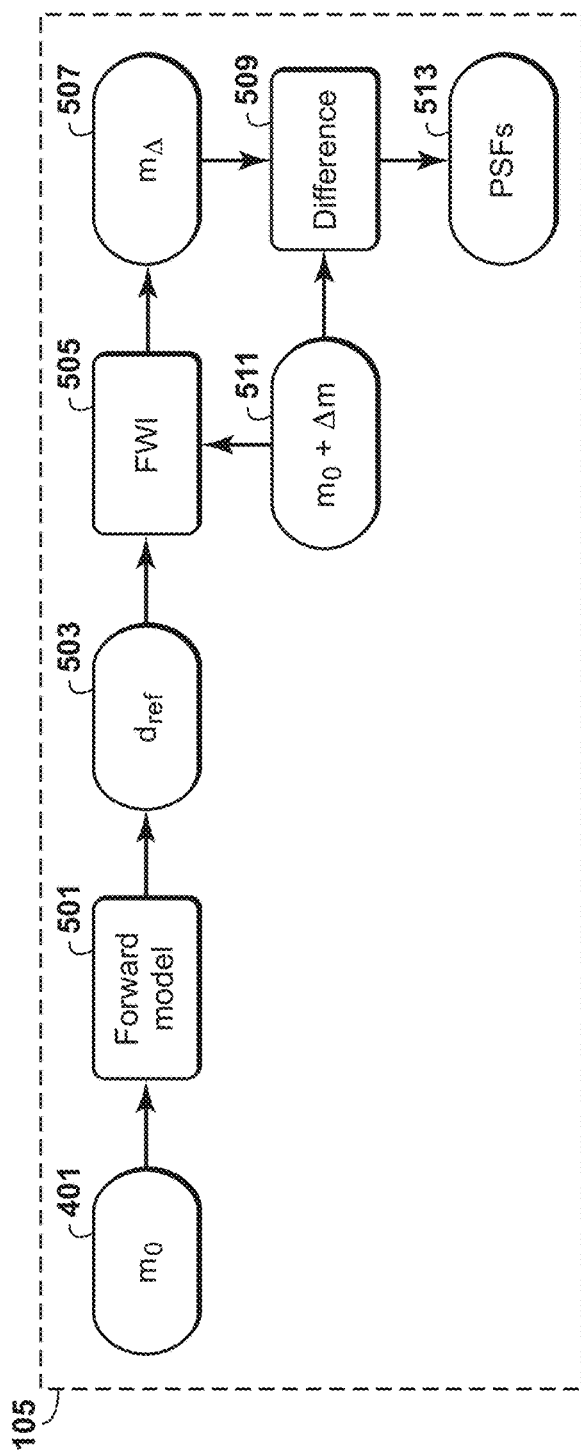
FIG. 5 is an exemplary method for extracting point spread functions.
Figure 6:
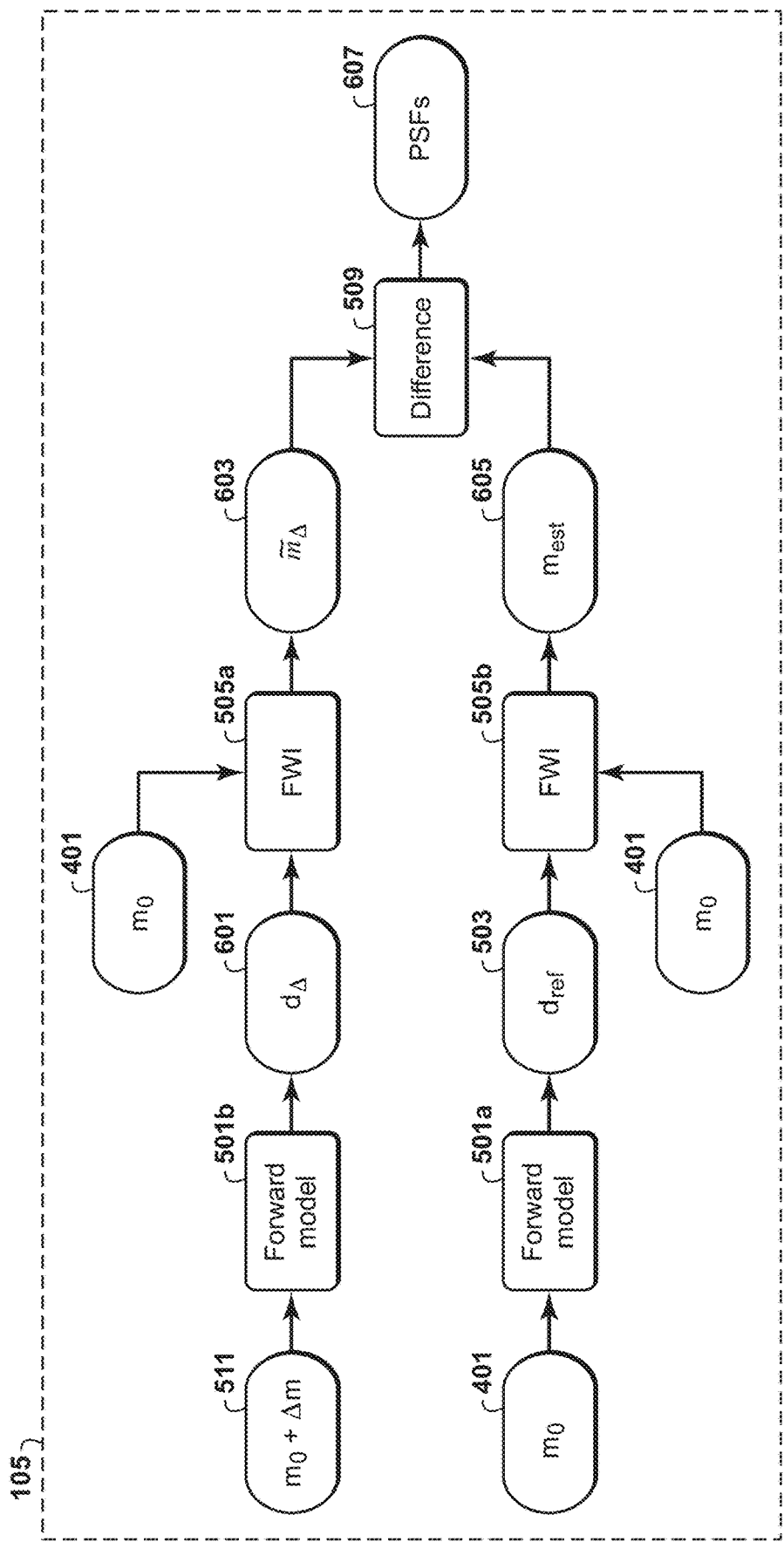
FIG. 6 is an exemplary method for extract point spread functions.

During an FWI application, the initial parameter model is updated through one or more iterations, by searching for the minimum misfit between simulated and observed data. The data misfit defines the FWI objective function, and for each iteration, its gradient and Hessian are computed to define a search direction and step size, respectively. It is well-known that point-spread functions are columns of the Hessian matrix associated with the inverse problem—from this perspective, the spatial compactness assumption holds for cases when the Hessian is nearly diagonal. For multiple iterations of FWI, each PSF extracted in this way represents a column of the full non-linear Hessian matrix, while within each iteration, each PSF corresponds to a column of the linear (e.g., Gauss-Newton) Hessian matrix. This means that there are both linear and non-linear versions of point-spread functions, and therefore there are several options around how or when to extract PSF information during an FWI application. Examples of methods to extract point spread functions are illustrated in FIGS. 4-6. Practical survey design projects have varying priorities on a case-by-case basis; some projects require rapid results to meet strict deadlines while others involve complex geologic environments requiring detailed and accurate design. For the former case, extracting linear PSF information is a preferred approach, while for the latter case, extracting the more comprehensive non-linear PSF information is a preferred approach. Both linear and non-linear point-spread functions can be extracted using the simultaneous extraction approach described in FIGS. 2C and 2D.

FIG. 4 describes efficiently computing PSFs using the action of the Hessian to a vector(s) containing isolated spikes or other patterns (computing the action of the Hessian to a vector is equivalent to computing the product between the Hessian matrix and a vector). In step 401, an initial model of the subsurface, $m_0$, is specified. This model consists of geophysical parameters such as velocities, densities, and attenuation that control seismic wave propagation. It may further include features such as salt and hydrocarbon reservoirs determined in step 101 that are known or suspected to be located in the subsurface. Model perturbations 405 ($\Delta m$) are manually-inserted changes (spikes) to geophysical parameters at one or more locations where it is desired to obtain PSFs. Acquisition parameters 403 are also specified. Using only the necessary steps of FWI, the action of the Hessian operator on $\Delta m$ is estimated in step 407. Computing PSFs this way does not require a full iterative application of FWI, but unlike linear imaging PSF estimation methods, our approach allows us to include the contribution of higher-order (second-order) terms of the Hessian (e.g., if an L2 objective function is used, the full Hessian typically contains two terms, the Gauss-Newton term, which is similar to the linear imaging Hessian, and a second-order term). There are several ways that the action of the Hessian on a vector can be computed, such as by using the adjoint state method, which involves performing linearized forward and adjoint modeling in a cascaded manner (see, e.g., Fichtner and Trampert, 2011), or by using the finite-difference approximation, which involves taking the difference of a perturbed and an unperturbed version of FWI gradients (Lee and Baumstein, 2011). It is well known to those skilled in the art of FWI or seismic imaging how to apply the Hessian to a model perturbation to determine the point spread function associated with that perturbation (Tang, 2011; p. 18-30). What has not been appreciated previously is that applying the Hessian to the composite perturbation $\Delta m$ of a plurality of subsurface locations rapidly generates a composite function from which FWI PSFs (409) can be efficiently windowed and evaluated for survey design purposes.

FIG. 5 describes computing nonlinear PSFs using a single application of FWI. Initial model 401 is used to generate synthetic seismic data 503 by means of simulation step 501. Acquisition parameters 403 are specified during the forward modeling step 501, and are therefore encoded in the synthetic data 503. Perturbed model 511 (same as 401+405 in FIG. 4) is taken as an initial model for nonlinear FWI step 505. Full Waveform Inversion step 505 can proceed either by inverting data synthesized from $m_0$ against a starting model of $m_0 + \Delta m$ (as shown in FIG. 5), or by inverting data synthesized from $m_0 + \Delta m$ against a starting model of $m_0$. Step 505 may further include one or several iterations of updates to the starting model. Multiple iterations of the iterative FWI process in step 505 may yield a more accurate model update, but such multiple iterations may not necessarily yield more useful PSFs, thus one FWI iteration can be sufficient in terms of balancing cost vs. results. Increasing the number of FWI iterations used to extract PSFs can be used to understand how the survey design influences the nonlinear update process, but adds computational cost. Each iteration of FWI step 505 produces a model update 507. The difference (i.e., subtraction or an adaptive subtraction operation) 509 between any model update 507 and perturbed model 511 gives a function of subsurface location from which nonlinear PSFs 513 can be windowed and evaluated.

FIG. 6 describes how nonlinear PSFs may be constructed with two applications of FWI. In this technique, initial model 401 is used to generate synthetic seismic data 503 by simulation step 501a. Perturbed model 511 is used to generate perturbed data set $d_\Delta$ 601 by simulation step 501b. The same initial model 401 can be used to drive FWI steps 505a and 505b to generate, respectively, alternate perturbed model 603 and model estimate 605. As before, difference operator (i.e., subtraction or adaptive subtraction) 509 gives a function of subsurface location from which nonlinear PSFs 607 can be windowed and evaluated. Full waveform inversion in practice is a band-limited process—that is, only a limited range of discrete angles and wave frequencies contribute to the spatial wavenumbers in the result. Therefore, a point perturbation can never be better resolved in practice than a wavenumber band-limited version of the input perturbation. Within this ideal bandwidth, wavenumber components can be missing due to incomplete sampling (acquisition). By analyzing the wavenumber spectrum of each extracted PSF, it is possible to identify these missing wavenumber components and then adjust the survey design to better recover them. Although other approaches are possible, PSF analysis in the wavenumber domain is the preferred embodiment of step 107 in FIG. 1. An application of FWI is deemed successful if it converges to the correct bandlimited parameter model—this is only possible if the wavenumber content of the input reflectivity data and initial parameter model nearly overlap or can be bridged with other subsurface information such as well log data. Because of this, survey designs which capture more complete wavenumber coverage are technically more valuable for FWI.

FIGS. 7A-F illustrates how the linear Born approximation can be used for predicting how changing survey design parameters such as aperture, offset, and frequency content can change the wavenumber coverage of a PSF. Although FWI is a nonlinear iterative process, the linear Born approximation still provides a guide for analyzing and interpreting the wavenumber content observed in FWI point-spread functions. Properties including but not limited to directional bandwidth, angular wavenumber coverage, or overall wavenumber coverage can be extracted at each PSF window center location using concepts such as those illustrated in FIGS. 7A-F.

Patterns and properties seen in plots like those in FIGS. 7A-F can be used by one skilled in the art of FWI to interpret wavenumber PSFs such as the one shown in FIG. 3B in terms of survey design parameters. These patterns also provide templates for automating point-spread function analysis and evaluation (steps 107-109 of FIG. 1) in the wavenumber domain. FIG. 7A illustrates the ideal band-limited wavenumber coverage achieved by surrounding a target survey with sources and receivers. In reality, most geophysical surveys are performed on the earth's surface, which limits how much reflected wavenumber content can possibly be achieved. FIGS. 7B and 7C illustrates that wavenumber coverage changes in a predictable way as survey parameters such as aperture are varied. FIG. 7C illustrates that wavenumber coverage changes in a predictable way as frequency content is varied. If sources and receivers are far enough apart that transmitted waves are acquired, the energy from these waves appears along the horizontal wavenumber axis (FIGS. 7E and F). More complete wavenumber coverage, especially at low wavenumbers, will tend to improve FWI performance. Therefore, survey designs can be evaluated by weighing costs, timing, hazards, and other practical constraints against how much wavenumber coverage they provide in the target region.

The connection between PSF properties, survey design metrics, and survey design parameters must be understood to evaluate candidate survey designs, as in step 109 in FIG. 1. Survey design parameters include, but are not limited to, frequency content and timing of sources, bandwidth of receivers, and spatial coordinates of both. Examples of survey design performance metrics include but are not limited to illumination (how much useable seismic energy reaches and reflects from a subsurface location), dip-dependent illumination (illumination for a given target surface oriented with an assumed dip-angle), spatial resolution (minimum vertical and lateral sizes of subsurface objects which can be imaged), parameter resolution (the minimum detectable change in a particular model parameter such as seismic velocity), and angular coverage (the range of angles incident to and scattered from a target location). PSF properties can be measured in a variety of domains, but a preferred domain is the wavenumber domain as illustrated in FIGS. 3B and 7A-F. This is because it is well-known that magnitudes and angles with respect to the origin in this domain correspond to wavelengths and physical directions in the spatial domain. Wavenumber PSF properties have been discussed above, but their use in the present technological advancement is to be interpreted as survey design metrics to quantify the performance of a candidate survey. These metrics can be connected—whenever possible—to survey design parameters in order to update or improve a candidate survey design. For example, one of the most important seismic survey design metrics—illumination—is proportional to the PSF property of overall amplitude (discrete summation of all amplitudes of a single PSF). So, by extracting a PSF at the target location and summing its total amplitude, one can estimate illumination at the target. The central PSF value is another relative measure of illumination. Increasing illumination at a target location simply provides redundant information at the location, which is known to boost the signal-to-noise ratio of the seismic image. From experience, a threshold value of minimum illumination can be used to determine whether or not a candidate survey provides the signal-to-noise ratio needed to image the target. Deficiencies in illumination can then be compensated by changing a survey design parameter, for example, by adding more sources and receivers to the survey design, or by changing the spatial coordinates of source and receiver positions such that they are closer together.

Several other PSF properties involve summing wavenumber amplitudes in meaningful sub-regions of the full wavenumber domain. These include summing within angular wedges (proportional to dip-dependent illumination) or summing within ranges of constant wavenumber magnitude (proportional to wavenumber illumination). To sum along specific paths within the wavenumber domain, a generalized Radon transform can be used. Still other PSF properties involve estimating some measure of range or bandwidth of the amplitudes present in the wavenumber domain, which requires the geophysicist to select a threshold amplitude value below which the PSF amplitude is deemed negligible (i.e., not captured by the survey design). Once this threshold is determined, it is possible to measure PSF properties such as the wavenumber range with amplitudes above the threshold value (proportional bandwidth and spatial resolution) or the range of angles which include amplitudes above the threshold (proportional to angular coverage). The wavenumber range can be further partitioned into narrow slices of constant-angle (proportional to dip-dependent bandwidth and resolution).

Extracting and analyzing individual PSF properties can be insightful, but typical survey design objectives are concerned with improving data quality throughout the subsurface volume or over a geologically significant region, such as at a target depth, a particular stratigraphic layer, or a volume around a known hydrocarbon reservoir. FIG. 8 illustrates how properties of the extracted point-spread functions can be mapped throughout the subsurface or a target region. This yields a map of spatially dependent values which can be interpolated, displayed, and/or used in an optimization scheme to evaluate candidate survey performance. Using PSF analysis results to generate coverage maps of key technical survey design metrics is the preferred embodiment of step 109 in FIG. 1. As an example, if lateral resolution is the primary technical objective of the survey design project, horizontal bandwidth can be estimated in the target region. It is well known in seismology that horizontal bandwidth is proportional to lateral resolution, so this map of the target region could be used as a survey design performance measure. Further, the wavenumber-domain PSF analysis may reveal that lateral bandwidth (and therefore resolution) can be increased by modifying the survey aperture, offset, or frequency content. The most effective modification can then be selected based on constraints such as safety, logistic feasibility, or cost.

PSF properties and their associated survey design metrics can be used in an optimization scheme to update survey design parameters. FIG. 9 illustrates an example of optimizing the position of a secondary source-only vessel during the acquisition of a 3D marine seismic survey. In this example, the primary source vessel 901 also tows the seismic receiver array 902 (only one receiver is shown for simplicity) and is moving at a predetermined speed. Data are simulated for the primary source vessel 901 over the subsurface parameter model, and the data are used with a perturbed parameter model to extract PSFs 903 (only one PSF is shown for simplicity) at key target locations using the methods described above (FIG. 9A). This simulation can be repeated for a range of receiver array positions, which may change due to practical factors such as marine current strength or direction.

Figure 9A:
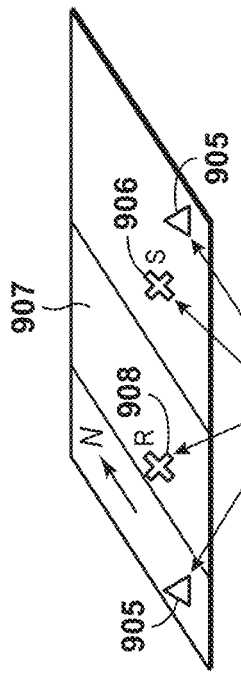
FIGS. 9A, 9B, 9C, and 9D illustrate an example of optimizing a survey design option using point spread function analysis.
Figure 9B:
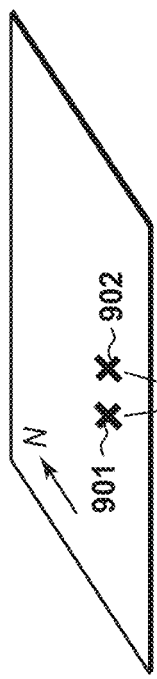

At each target location, low-amplitude wavenumbers in the PSF spectrum represent deficiencies in wavenumber coverage using the current survey design. These wavenumbers are therefore used to design a source function (a function that controls the time profile, orientation, and frequency distribution of a sweep for a given source) which contains desirable but missing wavenumber content and coverage angles. The low amplitude wavenumbers represent those parts of the PSF spectrum that were not capture with the current survey design. So by using them to design the source function, it will in turn point out survey locations that will help capture those previously non-captured parts. FIG. 9B provides an example of a target PSF 904 for a target location. The target PSF 904 is complementary to PSF 903 and provides information missing from PSF 903. This source function can be re-injected into the parameter model at the location of target PSF 904 via directional wave equation modeling, such as one-way finite difference, Gaussian beam, or ray-tracing. The missing PSF wavenumber coverage can be back-propagated to determine new source-receiver (S-R) locations 905 and 906. By considering wavefield reciprocity, wherever energy from this wavefield simulation intersects potential source-receiver (S-R) pair survey locations, these survey locations are likely to contribute deficient wavenumber content back to the target, should they be acquired. Although it is possible to inject several of these source functions simultaneously, a preferred implementation is to inject one source at a time to maintain a clear connection between candidate source-receiver pair locations and the target locations that they will improve. After repeating this process for many PSF locations (not shown for simplicity), each candidate S-R survey location 905 and 906 is weighted by the amount of energy it receives and by the priority of contributing PSF target locations (priority determined, for example, by geologic, engineering, or survey timing considerations). Since the primary source vessel also tows the receiver array, the receiver locations are already determined as a function of time (primary vessel receiver patch 907) regardless of the secondary vessel source position. Therefore, any candidate S-R pair locations must have one of the pair that matches an existing point in the current set of known primary vessel receiver positions. All S-R pair locations which do not meet this condition are eliminated as candidates (e.g., pair 905). For any S-R candidate pairs which do meet this criterion, the matching location within the pair is assigned as the receiver position. The remaining location within the pair is assigned as a candidate source location which must be fired at a time that its paired receiver is correctly positioned in order to contribute the deficient wavenumber energy.

Figure 9C:
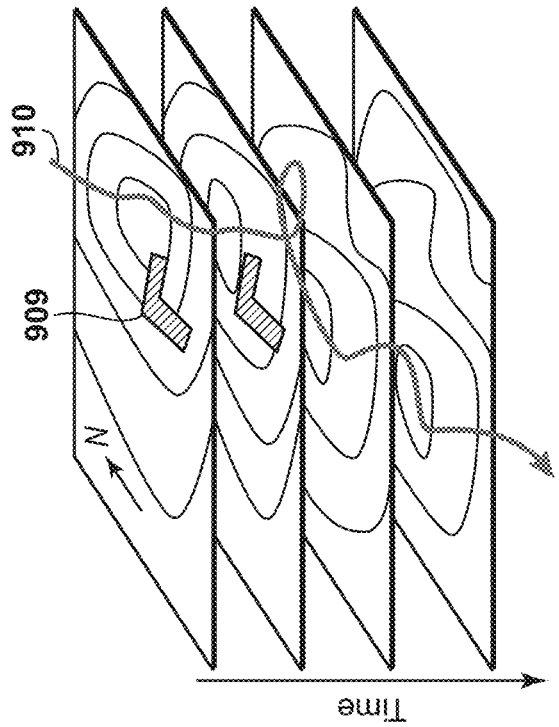
Figure 9D:
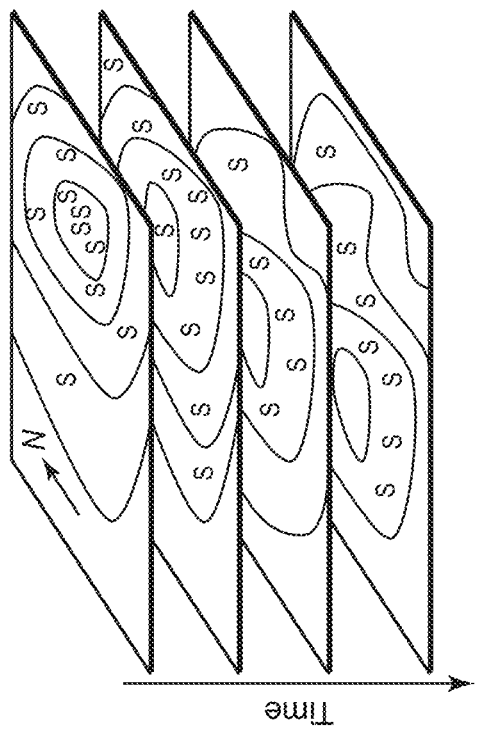

Continuing the same example, the goal from here on is to find the most efficient secondary vessel travel path for capturing deficient energy. To accomplish this, candidate source locations (designated S in FIG. 9C) can be filtered by those which are feasible considering the primary vessel positions and then weighted by value. The candidate source locations can be weighted by source candidate density. The circles or curves in FIGS. 9C and 9D represent density (the tighter or smaller the curve or circle the higher the density of candidate source locations). The candidate source locations and their associated weights are mapped as a function of their required firing times (FIG. 9C). This creates a discrete volume $M(x,t)$ with weighted elements that are ordered by indices representing physical distance and time steps in survey coordinates. Additional constraints can be added at this point to include vessel speed and acceleration limits, crew safety, exclusion areas, infrastructure 909, and the relative position of the primary vessel. Weights can also be altered to include spatial and temporal tolerances for factors such as source position (e.g. by applying a smoothing filter to the weight values), or they can be specified probabilistically to incorporate uncertainty in factors such as receiver position. It is intuitive to assign weights which indicate a positive relation to survey design objectives, but it is computationally convenient to consider the element-wise inverse of $M(x,t)$, as $W(x,t)$. In computational science terms, $W(x,t)$ represents a graph with a vertex at each element, and edges inversely proportional to both the element separation and the assigned weight. It will be well-known to those skilled in the art of discrete optimization that for a given secondary vessel starting location $x_0$, the shortest path through this weighted configuration space (or, equivalently, the longest path if we do not invert weights) can be determined using a variety of algorithms (e.g., Dijkstra's algorithm, bidirectional search, iterative improvement, simulated annealing, etc.). For example, if we consider space-time path coordinates as a single vector s and then take a continuous form of $W(s)$, we can express the problem as a special case of Fermat's functional, $$J = \int_{s_0}^{s_f} W(s)ds \tag{1}$$

where J is the total weighted distance along a path which starts at $s_0$ and ends at $s_f$. Optimal auxiliary vessel paths correspond to stationary paths of this functional. This framework provides an alternative to grid-search, as stationary paths may be found by solving for extremals of J using calculus of variations.

These types of algorithms search potential travel paths between elements of $M(x,t)$ or $W(x,t)$, penalizing steps which are weighted unfavorably. The "length" of the total path is an integrated combination of the assigned weights and the physical time-distance separation, which makes it suitable for incorporating both technical and logistical constraints. For example, longer paths may tend to provide better data because they cover more physical distance, but they increase monetary costs associated with fuel or vessel daily rates—tradeoffs like these can be readily incorporated in our approach. A range of logistically feasible $x_0$ is tested in this way, and the overall most efficient travel path 910 for the secondary boat is selected to be carried out in the survey (FIG. 9D). It will be apparent to a trained geophysicist or computational scientist that many other survey design options can be configured through similar optimization schemes. These optimization schemes may include one or more iterations or may be used to optimize one or any number N survey design parameters simultaneously, any of which may be time-varying. For example, N additional source vessels may each have different optimal paths when found simultaneously than if only one vessel path is optimized at a time, and some vessels may only be available for a portion of the survey duration.

Figure 10A:
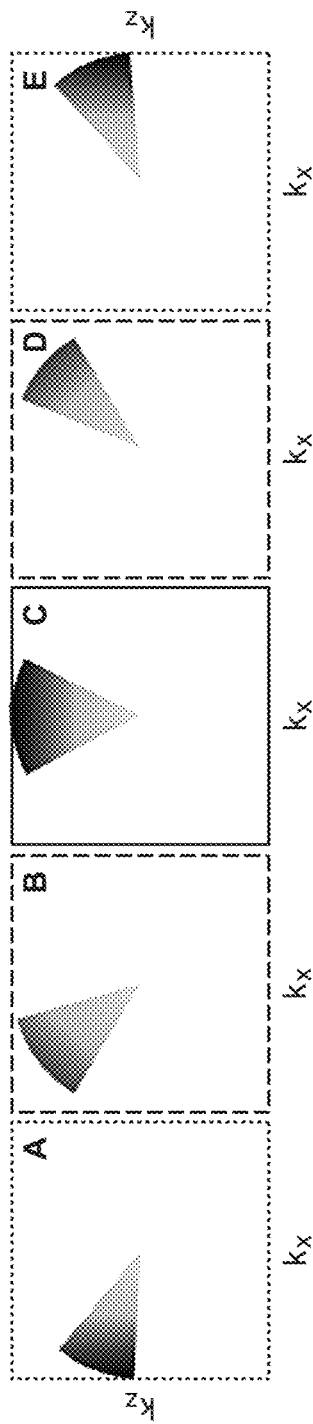
FIGS. 10A and 10B illustrate exemplary locations determined by pre-computing point spread function wavenumber sector responses.
Figure 10B:
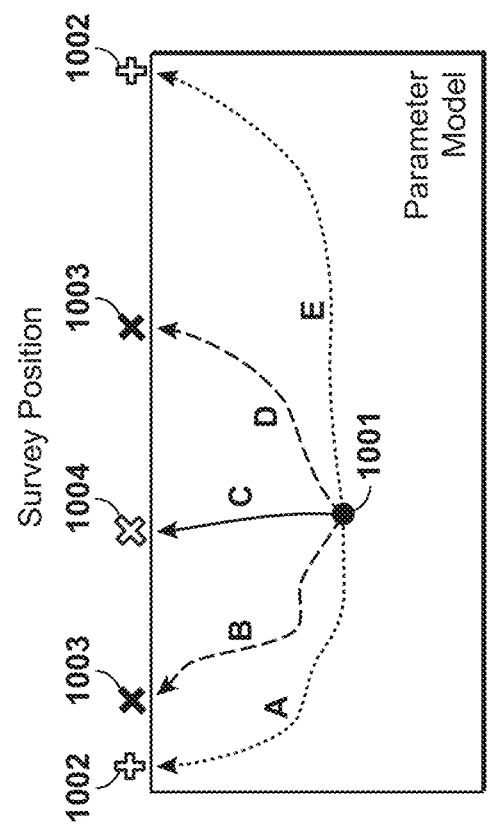

The approach described in FIGS. 9A-D combines FWI PSF wavenumber coverage with the ability to generate directional sources into a framework which allows one to predict valuable source-receiver pair locations that capture various wavelengths and incident angles for any given target location. This can also be done independent of an initial survey geometry, and can even be used without FWI or imaging to optimize survey designs. An example workflow containing four steps illustrates one way this can be done. First, the prior parameter model is constructed and target regions identified. Second, for each target location, directional wave propagation is used to inject several source functions individually, each of which contains a specific region of the PSF wavenumber coverage (see FIG. 10A). FIG. 10A shows five different angular wedges (a-e) in the PSF wavenumber domain, which are used to design five source functions. These source functions correspond to different sections (a-e) and bandwidths of the injected source in the spatial domain. Each source function can include a desired angle range and/or bandwidth of point-spread function wavenumber domain coverage. We refer to these simulations as point-spread function sector responses, and they may be pre-computed for any number of target locations. Weights for more important targets or more important wavenumber regions can be increased. Third, source-receiver pair locations are identified from regions within the potential survey area at which the highest wave energy arrives, as shown in FIG. 10B. These candidate location pairs are mapped. Directional control on simulated waves leaving the target PSF location 1001 (whether from ray-tracing, beam-forming, or one-way wave propagator) enables source-receiver pairs to be identified, which are connected by physical realizable scattering (reflections, diffractions, transmissions, and/or refractions). The source-receiver pairs 1002 and 1003 can be weighted, mapped, and input to survey layout optimization scheme. The source function injection process should be able to preserve direction, such that candidate source-receiver pair locations can be identified based on survey regions that capture the most energy. The source-receiver pairs 1002 and 1003 show potential travel paths for reflected waves from target PSF location 1001. 1004 represents an unpaired source/receiver, which may be used if the waves are diffracted from or incident perpendicular to the target PSF location 1001. Fourth, practical constraints on survey equipment and layout are applied to select an optimal source path which maximizes target PSF wavenumber coverage; since source-receiver pairs are known, this path will have correctly positioned receivers. This workflow produces a product that could be construed to be similar to that of so-called visibility analysis (Jin and Xu, 2010). However, unlike visibility analysis, we use directional wavefield simulation from target regions (as opposed to simulating from the survey location). Further, we exploit directional wavefield simulation to keep track of source-receiver pair locations corresponding to specific regions, with the goal of maximizing target PSF wavenumber coverage. Since PSF sector responses can be precomputed for a given prior parameter model, constraints or weights can be adjusted to rapidly explore how a survey design changes with various scenarios (e.g., changing equipment or target priority).

Comprehensive survey design is naturally expressed as a multi-objective optimization problem. While point spread functions can be used in a variety of ways to quantify the technical objectives, other objectives such as cost, logistics, safety, and timing, must also be considered. Each of these objectives may define its own objective function—independent of or jointly with—other objectives. In this context, we may have some number n objective functions J which are dependent on survey design parameters 4, given geologic parameter model m. The relative importance of each objective can be incorporated by a weighting factor w. One example of how to combine these multiple objective functions is through the weighted metric method, $$L_P(\xi;m) = (\Sigma_{i=1}^n c_i w_i |J_i(\xi;m) - z_i|^P)^{1/P}. \quad (2)$$

Here, the P-norm is used to combine weighted scalarized values for each objective with respect to some reference point $z_i$. Since each objective may be defined in different physical units, conversion factors $c_i$ are included as well. A common practice in weighted metric methods is to require the sum of weighting factors w to equal unity. The goal of the optimization scheme is to find the maxima (or minima) of $L_p$, and study how the value of $L_p$ changes with respect to ξ. Grid search methods are expensive but straightforward, and iterative solving methods can be used to step toward optimal solutions, if derivatives of $L_p$ (or at least $J_i$) with respect to elements of ξ can be evaluated.

As an example, we may choose to jointly maximize the $L_1$ norm (P=1) of n=2 objective functions corresponding to technical and financial considerations. First, we would decide the units of $L_1$, which for this example will be dollars, and that we believe cost is slightly more important than technical quality. In this case, $J_2$ might represent the monetary cost of each survey design candidate in dollars; $w_2=0.6$ is the relative importance of financial considerations (compared to technical); $c_2=1$, since $J_2$ is already defined in dollars, and $z_2$ could be the target minimum budget for the survey. $J_1$ would quantify how well candidate survey designs meet technical objectives—for this example, let's say we are only concerned with vertical resolution in meters. $J_1$ could be computed using vertical wavenumber bandwidth measurements from PSFs, as discussed above. The reference point $z_1$ may correspond to the desired resolution at the drilling target estimated by geologists before the survey (say 25 meters), and we know that $w_1=0.4$ in order to satisfy the uniform weighting condition. It should be clear that $c_1$ is a highly subjective parameter which, in this case, effectively assigns a dollar value to every incremental meter of resolution. There will be many such subjective parameters in any survey design optimization scheme; the values of these parameters must come from experience and may be dramatically varied on a case-by-case basis. Using a grid search, several survey designs can be evaluated using equation 2, and the survey design with the lowest multi-objective P-norm value would be selected and carried out.

While the above usage describes how to combine several distinct objectives, it is also obvious that individual objectives $J_i$ can themselves each be computed as a weighted sum similar to equation 2. For example, many technical objectives such as vertical resolution, illumination, and angular coverage could be extracted using FWI PSF analysis, then weighted and summed to build the technical objective function using equation 2. Once the technical objective function is evaluated, its contribution would then be combined with and weighed against other objectives (operational, cost, etc. . . . ), again using equation 2 in the overall survey design objective function.

The weighted metric approach described by equation 2 is just one well-known multi-objective optimization method. Other approaches (value function method, Benson's algorithm, modern portfolio theory, etc.) will be apparent. It is also well-known that multi-objective problems may not have unique optimal solutions, especially if relative weighting factors are changed among the different objectives. Instead of a single optimal design, it may be more advantageous to consider many candidate designs which are so-called Pareto optimal, that is, none of their individual objective values can be improved without damaging other objective values.

The geologic model is also a source of uncertainty, especially before carrying out the geophysical survey. FWI PSF analysis may readily be repeated for various geologic scenarios, in which case the optimal survey design may not be the best survey for any single model, but rather the most robust survey design to the geologic uncertainty.

The survey design which best meets technical objectives and practical constraints is accepted and carried out.

In all practical applications, the present technological advancement must be used in conjunction with a computer, programmed in accordance with the disclosures herein. Preferably, in order to efficiently perform FWI, the computer is a high performance computer (HPC), known as to those skilled in the art, Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The foregoing description is directed to particular example embodiments of the present technological advancement. It will be apparent, however, to one skilled in the art, that many modifications and variations to the embodiments described herein are possible. All such modifications and variations are intended to be within the scope of the present invention, as defined in the appended claims. As will be obvious to the reader who works in the technical field, the present technological advancement is intended to be fully automated, or almost fully automated, using a computer programmed in accordance with the disclosures herein.

REFERENCES

The following references are hereby incorporated by reference in their entirety:
Dickens, T. A., and G. A. Winbow, 1997, Spatial resolution of diffraction tomography, Journal of Acoustical Society of America, 101, 77-86;
Fichtner and Trampert, 2011, Hessian kernels of seismic data functionals based upon adjoint techniques, Journal International, 185, 775-798;
Jin, S. and S. Xu, 2010, Visibility analysis for target-oriented reverse time migration and optimizing acquisition parameters, The Leading Edge, 29, 1372-1377;
Lee S., and A. Baumstein, U.S. Pat. No. 9,176,930;
Lecomte, I., 2008, Resolution and illumination analysis in PSDM: A ray-based approach, The Leading Edge, 27, 650-663;
Miller, C. R., and P. Routh, 2007, Resolution analysis of geophysical images: Comparison between point spread function and region of data influence measures, Geophysical Prospecting, 55, 835-852;
Routh, P., C. Krohn, and N. Downey, Seismic Survey Design using Full Wavefield Inversion (U.S. patent application Ser. No. 14/797,654) (Routh et al. 2014);
Xie, X. B., S. Jin, and R. S. Wu, 2006, Wave-equation-based seismic illumination analysis, Geophysics, 71, S169-S177;
Tang, Y., 2011, Imaging and Velocity Analysis by Target-Oriented Wavefield Inversion: Ph.D. Dissertation, Stanford University; and
Chen, B. and X. Bi Xie, 2015, An efficient method for broadband seismic illumination and resolution analyses, Expanded Abstracts of 85$^{th}$ Annual Meeting of Society of Exploration Geophysicists, 4227-4231

What is claimed is:

1. A method for conducting a geophysical survey of a subsurface region of interest, comprising:
obtaining a subsurface parameter model for the subsurface region of interest;
providing an initial candidate survey design for a geophysical survey of the subsurface region of interest;
determining, with a computer, point spread functions for a plurality of parameter locations in the subsurface parameter model by performing at least a portion of a first iteration of an iterative full wavefield inversion process, wherein the determining comprises simultaneously approximating the point spread functions for corresponding parameter locations in the subsurface parameter model by perturbing the subsurface parameter model;
determining at least one property for each of the point spread functions;
analyzing, with a computer, the point spread functions by transforming the point spread functions to a wavenumber domain and comparing the transformed point spread functions to predetermined point spread amplitude patterns in the wavenumber domain, wherein the analyzing comprises analyzing a wavenumber spectrum of the transformed point spread functions, identifying missing wavenumber components, and adjusting parameters of the initial candidate survey design to better recover missing wavenumber components;
evaluating the adjusted candidate survey design based on the at least one property for each of the point spread functions;
and carrying out a geophysical survey of the region of interest based at least in part on the evaluation of the adjusted candidate survey design, wherein the geophysical survey comprises a seismic survey or an electromagnetic survey of the region of interest,
wherein performing the geophysical survey includes optimizing a vessel travel path and towing a seismic receiver array along the vessel travel path indicated by the optimized candidate survey design.

2. The method of claim 1, wherein the analyzing comprises back-propagating a simulated wave from a target in a subsurface parameter model to identify source or receiver locations that can be used to recover the missing wavenumber components.

3. The method of claim 1, further comprising generating a coverage map for the least one property for each of the point spread functions.

4. The method of claim 1 wherein the subsurface parameter model is perturbed with a plurality of spikes.

5. The method of claim 1, wherein the extracting includes using a subsurface parameter model, acquisition parameters, and perturbations to the subsurface parameter model as inputs the iterative full wavefield inversion process and performing enough of the full wavefield inversion process to calculate a Hessian operator applied to the perturbations to the subsurface parameter model.

6. The method of claim 1, wherein the extracting includes creating synthetic data by forward modeling a subsurface parameter model, using the synthetic data and a perturbed version of the subsurface parameter model in the at least a portion of a first iteration of the iterative full wavefield inversion process to generate an updated subsurface parameter model, and determining the point spread functions based on a difference between the updated subsurface parameter model and the perturbed version of the subsurface parameter model.

7. The method of claim 1, wherein the extracting includes performing multiple full wavefield inversion processes to derive different updated models relative to the subsurface parameter model, and determining the point spread functions based on a difference between the different updated subsurface parameter models.

8. The method of claim 1, further comprising adjusting at least one of frequency content of sources, source activation timing, receiver bandwidth, spatial coordinates of a source, or spatial coordinates of a receiver based on the at least one property for each of the point spread functions.

9. The method of claim 1, wherein a first full wavefield inversion process uses synthetic data forward modeled from a subsurface parameter model and a second full wavefield inversion process uses synthetic data modeled from a perturbation of the subsurface parameter model.

10. The method of claim 1, further comprising determining acquisition parameter updates for the candidate survey based on the at least one property for each of the point spread functions, and selecting which acquisition parameter updates to implement by using a survey design objective function that relates the at least one property for each of the point spread functions to acquisition parameters.

11. The method of claim 1, wherein the evaluating comprises using the at least one property for each of the point spread functions as a survey design metric to quantify performance of the candidate survey.

12. A method, comprising:
obtaining a survey design objective function, which expresses at least one point spread function property as a function of at least one acquisition parameter;
within a target region, designing source functions which cover targeted point spread function wavenumber content;
injecting the designed source functions into a parameter model of a subsurface region of interest to identify and select an initial survey design of the subsurface region of interest which obtains the targeted point spread function wavenumber content;
performing, with a computer, at least a portion of a first iteration of an iterative full wavefield inversion process, which is at least sufficient to yield point spread functions distributed throughout a subsurface parameter model for the initial survey design, wherein the performing comprises simultaneously approximating the point spread functions for corresponding parameter locations in the subsurface parameter model by perturbing the subsurface parameter model;
determining properties of the point spread functions;
analyzing the point spread functions by transforming the point spread functions to a wavenumber domain;
updating the initial survey design of the subsurface region of interest by grid search or stepping toward optimal survey parameters based on the survey design objective function and the properties of the point spread functions;
and carrying out a geophysical survey of the subsurface region of interest based at least in part on the updated initial survey design of the subsurface region of interest, wherein the geophysical survey comprises a seismic survey or an electromagnetic survey of the region of interest,
wherein performing the geophysical survey includes optimizing a vessel travel path and towing a seismic receiver array along a the vessel travel path indicated by the adjusted optimized candidate survey design.

* * * * *